United States Patent Office.

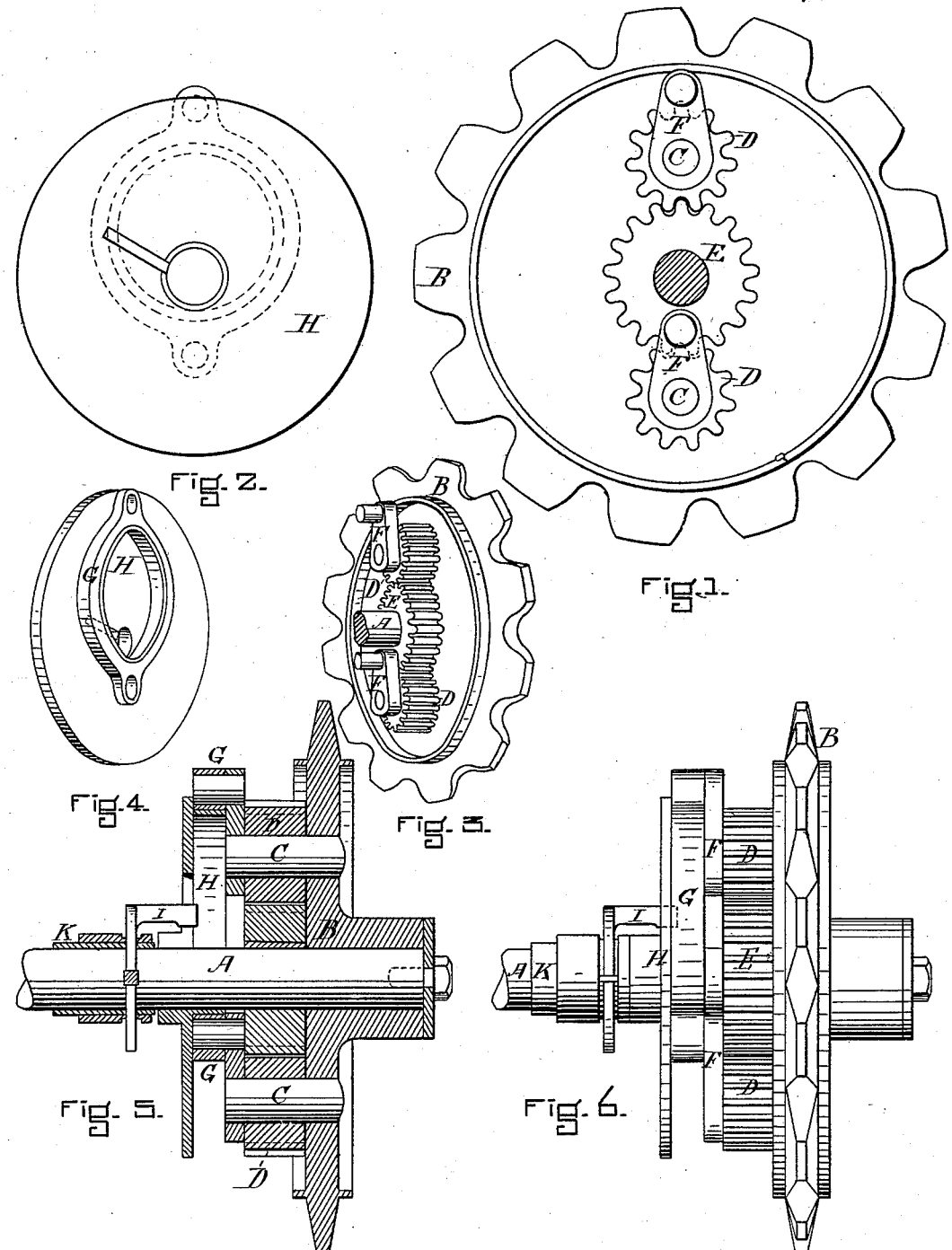

THOMAS MILLWARD, OF SHEPHERDS BUSH, AND CHARLES LENI, OF HAMMERSMITH ROAD, COUNTY OF MIDDLESEX, ENGLAND, ASSIGNORS TO THE POPE MANUFACTURING COMPANY, OF HARTFORD, CONNECTICUT.

VELOCIPEDE.

SPECIFICATION forming part of Letters Patent No. 307,133, dated October 28, 1884.

Application filed June 4, 1884. (No model.) Patented in England January 22, 1884, No. 1,918.

*To all whom it may concern:*

Be it known that we, THOMAS MILLWARD, of Shepherds Bush, and CHARLES LENI, of Hammersmith Road, both in the county of Middlesex, England, have jointly invented certain new and useful Improvements in Velocipedes, (for which we have obtained Letters Patent in Great Britain, No. 1,918, dated January 22, 1884,) of which the following is a specification.

Our improvements relate more particularly to that part of velocipede mechanism known as the "driving-gear," and to the class called "epicyclic speed and power gears," the object of which is to secure the advantages of greater power with less speed on ascending grades, and less power with greater speed on descending or level grades; and our particular contrivance may be briefly called the "eccentric" speed and power gear.

The object of our invention is to produce a driving-gear applicable to either a driving or a driven shaft, and which shall be simple, thoroughly effective, and less expensive to manufacture than others heretofore used.

Our invention will be more clearly understood from the following description, taken in connection with the drawings, in which—

Figure 1 shows in elevation a chain-wheel with driven and driving pinions in position. Fig. 2 shows a back view of cam with eccentric ring in position, in dotted lines. Fig. 3 is a perspective view of chain-wheel and pinions on a reduced scale. Fig. 4 is a front view of cam and eccentric ring, also on reduced scale. Fig. 5 shows in section our improvements in one form on a shaft, and Fig. 6 shows the same in elevation.

The same letters of reference refer to similar parts throughout all the figures.

A is a shaft or axle. Running loose upon it is the chain-wheel or sprocket B.

On the face of sprocket B are fixed two studs, C, upon which work the two pinions, D, which gear into the driving-pinion E, which is keyed fast on axle A.

Fixed on the pinions D are plates or cranks F, at the ends of which are studs upon which a ring, G, is fitted, which works on the eccentric cam H, which is loose on axle A.

Up against the cam H is a collar, K, and sliding upon this collar K is clutch I. By sliding the clutch I along and locking it into cam H the whole forms part and parcel of the chain-wheel and revolves together, and speed is obtained, while, by releasing the clutch I from the cam and locking it to frame of machine, the cam is held fast from rotating, the pinions D are driven round at a decreased rate in proportion to the number of teeth in driving and driven pinion, and power is obtained. By the aid of the sliding clutch the cam may be locked either to the chain-wheel or to the spindle to obtain speed, and by releasing it from the chain-wheel and locking it to the frame or other suitable part we obtain power. In relative proportion to the sizes of the driving-pinions and pinions driven we vary the power to any extent.

It is obvious that modifications in form and arrangement of the parts may be made without departing from the spirit of our invention, and we do not limit ourselves, therefore, to the form shown and described.

We claim as new and of our invention—

1. The described combination and arrangement of pinions and eccentrics, essentially as set forth.

2. In an epicyclic differential speed gear, the combination of a pinion-wheel keyed on a shaft, two pinions working on studs on a sprocket-wheel free on the shaft and gearing with pinion on the shaft, held in position to rotate round the driving-pinion by a cam, essentially as set forth.

3. The combination of spur-wheel E, pinions D D, cranks F F, ring G, cam H, and clutch I, constructed and adapted to operate essentially as set forth.

THOMAS MILLWARD.
CHARLES LENI.

Witnesses:
  E. GARDNER COLTON,
17 and 18 *Southampton Buildings, London, W. C.*
  A. CARRICK,
5 *Nicholas Lane, London, E. C.*